United States Patent Office 2,770,627
Patented Nov. 13, 1956

2,770,627

DESERPIDINOL AND SALTS THEREOF

Harold Belding MacPhillamy, Madison, N. J., assignor to Ciba Pharmaceutical Products, Inc., Summit, N. J., a corporation of New Jersey No Drawing. Application January 13, 1955,
Serial No. 481,720

5 Claims. (Cl. 260—286)

This invention relates to a new carbinol, named hereinafter deserpidinol; its salts, and the processes for the preparation thereof. I have found that deserpidinol can be obtained by subjecting organic sulfonic acid esters of alcohol esters of deserpidic acid to certain reducing agents described below. Deserpidic acid has the formula

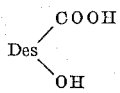

wherein Des represents the divalent organic radical of the empirical formula $C_{20}H_{24}ON_2$ bound to the hydroxyl and carboxyl group in deserpidic acid which contains a basic tertiary nitrogen atom.

The esters of deserpidic acid used as starting materials may be obtained according to copending application Serial No. 471,519, filed November 26, 1954, of Paul R. Ulshafer by degradation of the alkaloid deserpidine, described in copending application Serial No. 468,161, filed November 10, 1954, now abandoned of Paul R. Ulshafer, to deserpidic acid, esterification of the carboxyl group and subsequently conversion of the hydroxyl group into a hydroxyl group esterified with an organic sulfonic acid.

According to my investigations deserpidinol has the formula

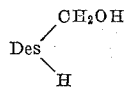

wherein Des has the aforesaid meaning. It has valuable properties; it can be used, for example, as active ingredient in sunburn compositions on account of its absorption of U. V.-light of the wave length range critical for the development of sunburn. Furthermore, it is a valuable intermediate for the preparation of compounds having related structure, which can be used in a wide field of applications, for example in medicine. According to my investigations deserpidinol can be converted, for example, into rauwolscinyl alcohol [Chatterjee and Pakrashi, Science and Culture (India), 19, 109 (1953)] by treatment with ether-splitting hydrolyzing agents, for example hydrobromic or hydriodic acid.

The process of the invention comprises treating organic sulfonic acid esters of alcohol esters of deserpidic acid with reducing agents capable of simultaneously replacing the esterified hydroxyl group by a hydrogen atom and reducing the esterified carboxyl group to the hydroxymethyl group so as to form deserpidinol. As a reducing agent there is especially useful hydrogen in statu nascendi. Preferably the reaction is carried out with lithium aluminum hydride in an appropriate solvent, such as tetrahydrofurane or ether. As starting materials, there are advantageously used aryl sulfonic acid esters of alkyl deserpidates, such as O-p-toluene sulfonyl methyl deserpidate.

Depending on the working conditions employed, the new compound is obtained as the free base or in the form of its salts. From the salts, the free base may be liberated by conventional methods. The base can be converted into its acid addition salts, by reaction with acids, for example hydrohalic acids, sulfuric acid, nitric acid, phosphoric acid, alkane sulfonic acids, alkyl sulfuric acids, hydroxyethane sulfuric acid, acetic acid, oxalic acid, citric acid, tartaric acid and the like.

The new compound can be made up into sun screen compositions according to the customary methods employed in making such preparations. Preferably it may be incorporated into a hydrophilic ointment which contains for example, glycols such as propylene glycol, higher aliphatic alcohols such as stearyl alcohol, white petrolatum, distilled water and the like.

The following example will serve to illustrate the invention, the relationship of parts by weight to parts by volume being the same as the gram to the milliliter and the temperatures given in degrees centigrade.

Example 2 parts by weight of p-toluene sulfonyl methyl deserpidate in 25 parts by volume of dry, freshly distilled tetrahydrofurane are added dropwise to a stirred slurry of 1.5 parts by weight of lithium aluminum hydride in 60 parts by volume of dry tetrahydrofurane. The mixture is then refluxed for five hours, after which 50 parts by volume of water are added cautiously with cooling. The tetrahydrofurane is distilled off and the aqueous suspension filtered. The residue is washed with water and then extracted five times with hot acetone. The combined acetone extracts are heated to boiling, filtered through a filter cell and evaporated to dryness. The oily residue is taken up in chloroform, washed twice with water, and the chloroform extract evaporated to dryness. Trituration with methanol yields colorless crystals. The thus obtained deserpidinol can be recrystallized from methanol and melts at 232–236° with decomposition; its optical rotation is $[\alpha]_D = -2 \pm 2$ (chloroform). The empirical formula of deserpidinol is $C_{21}H_{28}O_2N_2$. Its U. V.-spectrum shows a maximum at $\lambda=282$ ($\epsilon=7670$) (in chloroform).

Deserpidinol can be converted into rauwolscinyl alcohol as follows:

A suspension of 0.5 part by weight of deserpidinol in 5 parts by weight of freshly distilled hydrobromic acid is heated while introducing a stream of nitrogen for one and one-half hours at 105°. The material is dissolved during the reaction. The reaction mixture is poured into water and the precipitation filtered. The precipitation is dissolved in methanol, aqueous ammonia is added and the mixture added to the filtrate which has also been made basic. The thus obtained solution is extracted with chloroform and the chloroform extract evaporated to dryness. It is dissolved in a small volume of acetone and kept in a refrigerator overnight. The thus obtained rosettes of rauwolscinyl alcohols are solvated and melt with loss of solvent and decomposition unsharply beneath 190°. After sublimation rauwolscinyl alcohol melts at 229–231°.

The p-toluene sulfonyl methyl deserpidate used as starting material may be obtained as follows:

To 0.5 part by weight of desperidine is added a solution of 0.05 part by weight of sodium in 25 parts by volume of methanol. The mixture is refluxed under nitrogen for one hour during which the desperidine all dissolves. After cooling, the solution is concentrated in vacuo to a volume of about 10 parts by volume. 30 parts by volume of water are added and then concentrated hydrochloric acid in a dropwise manner until the solution is strongly acidic. It is then extracted with 15 parts by volume of ether and re-extracted with 3 portions each of 10 parts by volume of ether. The aqueous phase is then made basic with concentrated aqueous ammonia and extracted with 15 parts by volume of methylene chloride and re-extracted with 3 portions each of 10 parts by volume of methylene chloride. The combined methylene chloride extracts are dried over anhydrous potassium carbonate and concentrated in vacuo to give methyl deserpidate as a pale, yellow solid froth which analyzes for the empirical formula $C_{22}H_{28}O_4N_2$. In the same manner, by employing dry ethanol or butanol instead of methanol, the corresponding alkyl desperidates are obtained.

To a solution of 0.46 part by weight of methyl deserpidate (dried by distilling toluene from it twice) in 5 parts by volume of freshly distilled pyridine is added dropwise and with cooling 0.46 part by weight of p-toluenesulfonyl chloride in 1 part by volume of dry benzene. 1 part by volume of pyridine is used to rinse the reagent into the reaction flask which is securely stoppered and allowed to stand at 5° for 5 days. The reddish solution is poured into approximately 50 parts by volume of ice and water. 12 parts by volume of 5 percent aqueous ammonia are added and the semi-solid precipitate is triturated for about 5 minutes. The mixture is then extracted with three portions of methylene chloride of 50 parts by volume, 15 parts by volume and 10 parts by volume. The combined methylene chloride extracts are washed three times with small portions of a cold sodium chloride solution, dried over anhydrous potassium carbonate and evaporated in vacuo to a semi-crystalline residue. 0.63 part by weight of this is dissolved in methylene chloride, filtered through approximately 0.02 part by weight of activated charcoal on a diatomaceous earth filter cell, evaporated and crystallized from 4 parts by volume of benzene. Additional material is obtained from the benzene mother liquors. Recrystallization from methanol gives O-(p-toluenesulfonyl)-methyl deserpidate, melting at 226–228°.

Deserpidine may be obtained as follows:

500 parts by weight of dried, finely ground roots of Rauwolfia canescens are extracted batch-wise with methanol at its boiling point, using the following volumes and times, and filtering each extract while hot: 2,000 parts by volume, 1 hour; 1,000 parts by volume, 45 minutes; 1,000 parts by volume, 30 minutes; 1,000 parts by volume, 30 minutes. The extracts are combined and evaporated in vacuo to 75 parts by volume of thick syrupy solution. After the addition of 75 parts by volume of methanol and 150 parts by volume of acetic acid of 15 per cent strength with adequate mixing, the solution is extracted with 2 portions each of 100 parts by volume of hexane. The combined hexane extracts are extracted with 15 parts by volume of acetic acid of 15 percent strength. The latter extract is added to the above acetic acid phase which is then extracted with 3 portions each of 75 parts by volume and 1 portion of 50 parts by volume of ethylene chloride. The first 3 extracts are combined and washed with 60 parts by volume of 2 N sodium carbonate solution and then with 60 parts by volume of distilled water. These washing solutions are saved and used for the washing of the 4th and final ethylene chloride extract. The combined ethylene chloride extracts are dried over sodium sulfate, filtered and evaporated in vacuo to a constant weight of a tan, frothy solid. 1 part by weight of this residue is dissolved in 1.5 parts by volume of warm methanol and the solution cooled to 5° C. for 18 hours, whereby crystallization of reserpine sets in. After filtering from the crystallized reserpine and washing with cool methanol, the filtrate is freed of solvent in vacuo. 2 parts by weight of the resulting red-brown solid froth are triturated with 2 portions each of 25 parts by volume of benzene and filtered each time. The benzene insoluble material is saved for further treatment. The benzene soluble fraction is poured onto a column of 40 parts by weight of activated alumina (Woelm, Activity Grade I), which is then eluted first with 3 portions each of 50 parts by volume of benzene and then with 6 portions each of 50 parts by volume of benzene-acetone (9:1), the first of which benzene-acetone portions had been used for extraction of the above mentioned benzene insoluble material. The second of the 6 benzene-acetone elution fractions on removal of the solvents gives a light tan solid froth which on crystallization from methanol gives colorless prismatic needles of slightly impure deserpidine. Rechromatographing of 1 part by weight of this substance on 20 parts by weight of activated alumina (Woelm, Activity Grade I) using benzene and benzene containing 0.1 percent methanol as eluting agents followed by crystallization from methanol gives colorless prismatic needles of pure deserpidine, melting at 228–232° C.

What is claimed is:

1. A member of the group consisting of deserpidinol and acid addition salts thereof.
2. Deserpidinol.
3. Salts of the compound claimed in claim 1.
4. Process for the preparation of a new carbinol comprising reducing O-p-toluene sulfonyl methyl deserpidate with lithium aluminum hydride so as to produce deserpidinol.
5. Process for the preparation of a new carbinol comprising reducing an O-aryl-sulfonyl alkyl deserpidate with lithium aluminum hydride to form deserpidinol.

References Cited in the file of this patent

Beilstein, Org. Chem., vol. XXIII (2nd Supp. 1954) pp. 409–10.

Schlitter et al.: Experientia, vol. XI, No. 2, Feb. 15, 1955, pp. 64–65.

Cerletti et al.: Experientia, vol. XI, No. 3, Mar. 15, 1955, pp. 98–99.